US007082298B2

(12) United States Patent
Enns et al.

(10) Patent No.: US 7,082,298 B2
(45) Date of Patent: Jul. 25, 2006

(54) USING A MOBILE DEVICE TO COMPOSE AN ELECTRONIC MESSAGE THAT INCLUDES AUDIO CONTENT

(75) Inventors: Neil R. N. Enns, Redmond, WA (US); John Ian Ferrell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 09/773,353

(22) Filed: Jan. 31, 2001

(65) Prior Publication Data

US 2002/0102969 A1 Aug. 1, 2002

Related U.S. Application Data

(60) Provisional application No. 60/239,367, filed on Oct. 11, 2000.

(51) Int. Cl.
*H04M 1/658* (2006.01)
(52) U.S. Cl. ............... 455/412.1; 369/29.02; 455/466; 704/201
(58) Field of Classification Search ............. 455/412.1, 455/414.4, 457, 466, 414; 709/206; 379/88.17, 379/88.14, 88.16; 386/46; 704/270.1; 340/702
See application file for complete search history.

(56) References Cited

U.S. PATENT DOCUMENTS

| 5,717,742 | A | | 2/1998 | Hyde-Thomson | ............ 379/88 |
| 6,038,199 | A | * | 3/2000 | Pawlowski et al. | ...... 369/29.02 |
| 6,212,551 | B1 | | 4/2001 | Asghar et al. | ............. 709/206 |
| 6,222,909 | B1 | * | 4/2001 | Qua et al. | ................ 379/88.22 |
| 6,223,213 | B1 | * | 4/2001 | Cleron et al. | ................ 709/206 |
| 6,351,523 | B1 | * | 2/2002 | Detlef | ..................... 379/88.14 |
| 6,421,707 | B1 | * | 7/2002 | Miller et al. | ................ 709/206 |
| 6,453,281 | B1 | * | 9/2002 | Walters et al. | .............. 704/200 |
| 6,600,814 | B1 | * | 7/2003 | Carter et al. | ............. 379/88.16 |
| 6,636,733 | B1 | * | 10/2003 | Helferich | .................. 379/88.17 |
| 6,745,024 | B1 | * | 6/2004 | DeJaco et al. | .............. 709/206 |
| 6,760,696 | B1 | * | 7/2004 | Goldberg et al. | ........... 704/201 |
| 2001/0021649 | A1 | * | 9/2001 | Kinnunen et al. | .......... 455/412 |
| 2001/0045885 | A1 | * | 11/2001 | Tett | ............................. 340/7.2 |

(Continued)

FOREIGN PATENT DOCUMENTS

GB 2 347 581 9/2000

(Continued)

OTHER PUBLICATIONS

Kato, S., "Wireless Personal and Multimedia Communications", 1997, pp. 1-4, *Uniden Corporation*.

(Continued)

*Primary Examiner*—Fan Tsang
*Assistant Examiner*—Lisa Hashem
(74) *Attorney, Agent, or Firm*—Workman Nydegger (57) ABSTRACT

Methods, systems, and computer program products for using a mobile device to compose an electronic message by adding audio content to the message. Mobile devices include any type of portable or hand-held computing device, such as wireless telephones, personal digital assistants, and the like. After selecting the option to add audio content, the user speaks into the mobile device's audio input. The mobile device diverts the resulting audio stream into a temporary storage as the user speaks. To provide visual feedback, a progress indicator shows the user the amount of audio content stored compared to the amount that may be stored. An indicator shows that a message includes audio content as well as the size of the included audio content. No particular format or type is required for the audio content or electronic message.

40 Claims, 7 Drawing Sheets

U.S. PATENT DOCUMENTS

2002/0054750 A1* 5/2002 Ficco et al. ................... 386/46
2002/0059073 A1* 5/2002 Zondervan et al. ...... 704/270.1

FOREIGN PATENT DOCUMENTS

WO     WO 00/48377     8/2000

OTHER PUBLICATIONS

Zander, J., "On the Cost Structures of Future Wideband Wireless Access", 1997, pp. 1773-1776, *1997 IEEE 47th Vehicular Technology Conference*.

* cited by examiner

USING A MOBILE DEVICE TO COMPOSE AN ELECTRONIC MESSAGE THAT INCLUDES AUDIO CONTENT

RELATED APPLICATIONS

This application claims the benefit of U.S. Provisional Application No. 60/239,367, entitled, "INSERT VOICE ATTACHMENT IN A MAIL MESSAGE ON A MOBILE DEVICE," filed Oct. 11, 2000, which is hereby incorporated by reference.

BACKGROUND OF THE INVENTION

1. The Field of the Invention

The present invention relates to electronic messages and mobile devices. More specifically, the present invention relates to methods, systems, and computer program products for using a mobile device to compose an electronic message that includes audio content.

2. Background and Related Art

Over the past few years, email and other types of electronic messaging have become an almost indispensable form of communication. While, at least initially, email access and electronic messaging capabilities identified an organization or individual operating at the technological forefront, today the converse is true. No email access or electronic messaging suggests that an organization or individual is technologically backward. With the increasing importance of email in particular, access limited to home or office is proving to be inadequate. For example, many insist on the ability to access email remotely, such as through the World Wide Web ("Web") or some other technology. However, access generally requires the use of a desktop computer, a laptop, or personal digital assistant ("PDA"). Although many of these devices have decreased in bulk from earlier forms, they remain relatively large computing devices that may not be convenient for carrying on one's person at all times.

Figure 2:
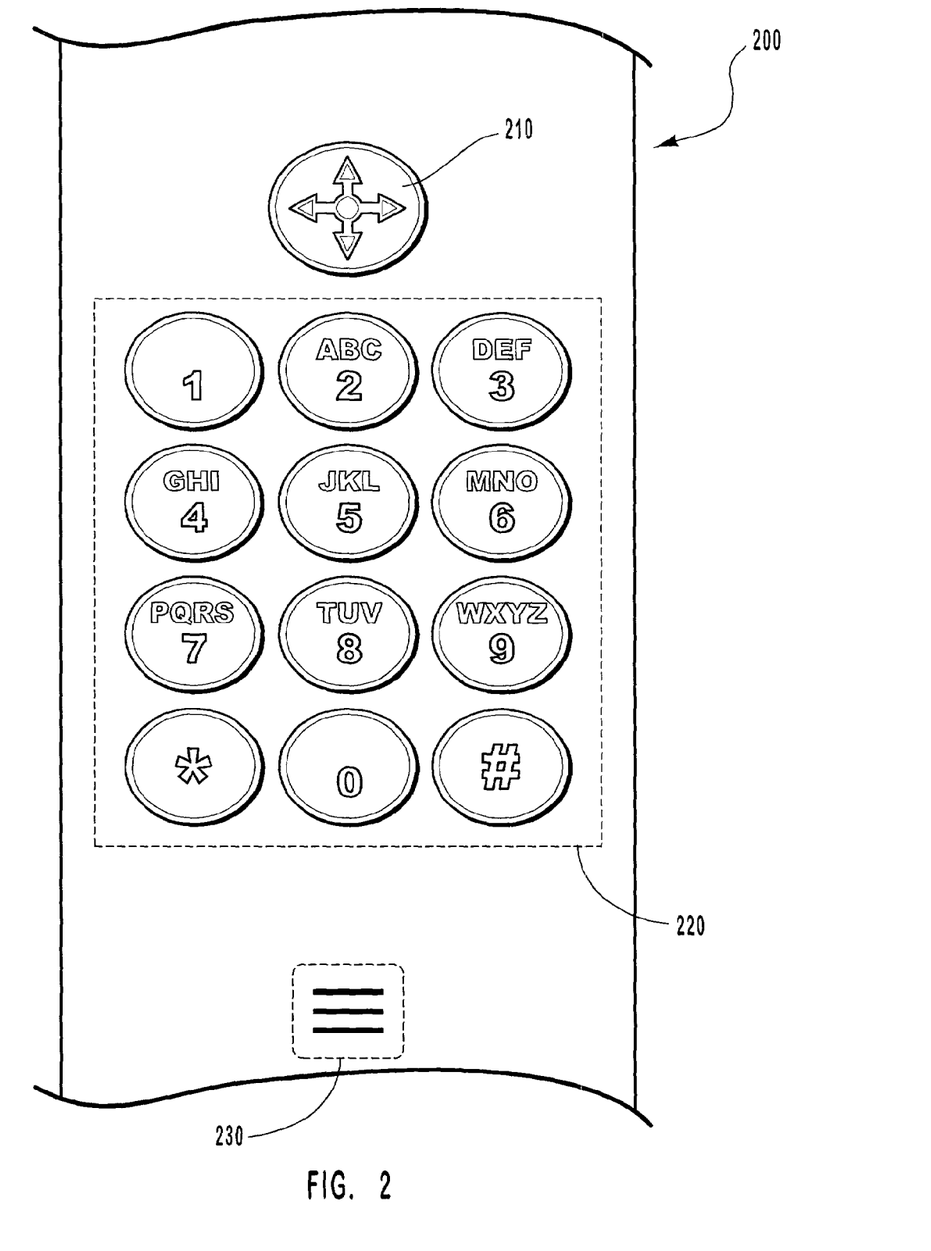
FIG. 2 is shows several input systems for mobile telephones.

Like desktops, laptops, and PDAs, mobile telephones have been reduced significantly in size and weight. Ever shrinking form factors and airtime costs have made mobile telephones extremely popular in today's society. In spite of their small size and convenience, however, mobile telephones typically have not been used for remote email access. Among other reasons, the lack of complete integration with email systems may be attributed to the tedious nature of entering text on a telephone keypad during the composition of an email message. FIG. 2 shows a typically keypad 220 for a mobile telephone 200. With three or four letters assigned to eight keys, it can be a significant chore to select individual letters and organize them into words. For example, multiple key presses may be required for selecting a single letter. In one system, the number of times a key is pressed corresponds to the position of the letters located on that key. Pressing "44 33 555 555 666" types the word "hello"—where spaces between numbers indicate relatively longer pauses between key presses. The number of key presses and need for somewhat precise timing can be quite cumbersome. Other text entry technology is available, but as a rule text entry on a mobile telephone keypad is far from ideal for the typical user.

SUMMARY OF THE INVENTION

The present invention allows a user to compose an email or other electronic message by adding audio content to the message. The user selects an option for adding the audio content and then speaks into a mobile device's audio input. As used in this application, the term "mobile device" should be interpreted broadly to encompass any type of portable and/or hand-held computing device, including wireless telephones, personal digital assistants, etc. The mobile device diverts the audio stream into a temporary storage, such as a file, as it is spoken. To provide the user with visual feedback, a progress indicator shows the amount of audio content stored in relationship to the maximum amount that may be stored for a single message, based on available memory. After being added, a text indicator shows that the message includes audio content as well as the size of the recording. No particular format is required for the audio content, but a WAV file format is the default. In an email message context, the audio content is added to the message as a standard Multipurpose Internet Mail Extensions ("MIME") attachment, but the invention does not exclude other techniques. Audio content may be added to a new email, a reply to an email, in forwarding an email, etc.

One benefit to a message, as opposed to live telephone communication and voice mail, is that a message allows the intended recipient to act on the message at the recipient's convenience. For example, a user may need to provide a recipient with certain information. Over a telephone communication, the user calls the recipient and requires immediate attention. In contrast, sending an electronic message, such as an email, does not interrupt the recipient's current activities and allows for action at the recipient's convenience. This feature is particularly useful where time zone differences would otherwise prohibit calling the recipient. While it may not be proper to call the recipient at 2AM, sending a message at 2AM does not impose any burden on the recipient whatsoever. A similar option may not exist in the telephone communication context, because to leave a voice mail, the user must first call the recipient's phone number. Although less imposing, similar issues exist during normal business hours when the user needs to provide the recipient information, but does not want to interrupt the recipient.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE INVENTION

The present invention extends to methods, systems, and computer program products for using a mobile device to compose an electronic message that includes audio content. Those skilled in the art will appreciate that the invention may be practiced in network computing environments with many types of computer system configurations, including personal computers, mobile/hand-held devices, such as personal digital assistants ("PDAs") and wireless telephones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media that may be accessed by a general purpose or special purpose computer. By way of example, and not limitation, such computer-readable media may comprise RAM, ROM, EEPROM, flash memory, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
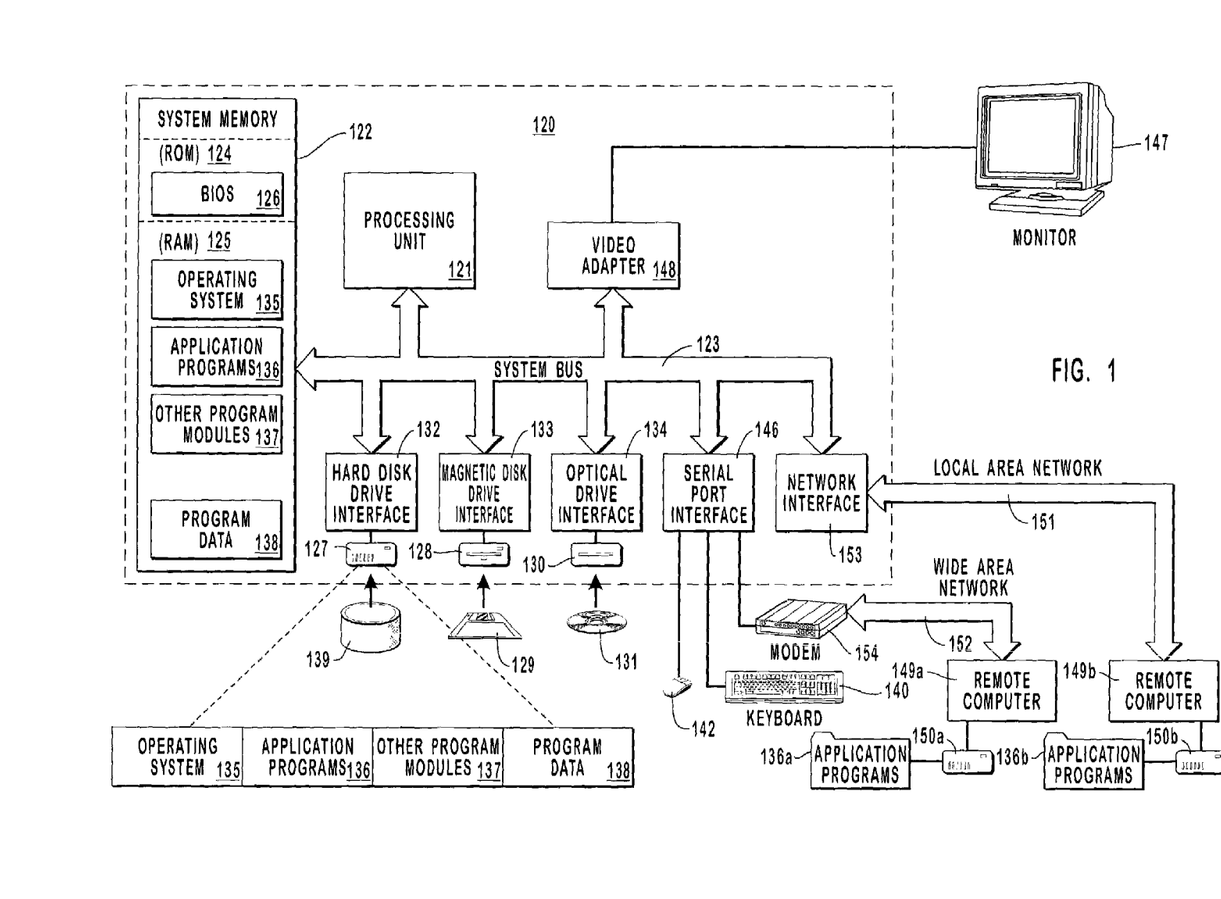
FIG. 1 illustrates an exemplary system that provides a, suitable operating environment for the present invention.

FIG. 1 and the following discussion are intended to provide a brief, general description of a suitable computing environment in which the invention may be implemented. Although not required, the invention may be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

With reference to FIG. 1, an exemplary system for implementing the invention comprises a general purpose computing device in the form of a generic computer 20, including a processing unit 21, a system memory 22, and a system bus 23 that couples various system components including the system memory 22 to the processing unit 21. Although some components of computer 20, such as monitor 47, keyboard 40, and mouse 42, may seem specific to a conventional computer, those of skill in the art will recognize that analogous components may be found in other computing devices. For example, wireless telephones often include an LCD or plasma display area, a numeric keypad, and one or more navigation buttons. Therefore, any component described with reference to generic computer 20 should be interpreted broadly to encompass analogous components that are appropriate for and consistent with a particular implementation or embodiment of the present invention. In some implementations, a component may be connected only intermittently or may be missing entirely.

The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like. Note that decreasing form factors are making it practical to use at least some of the foregoing components with mobile devices. Furthermore, it is anticipated that future technological advances with respect to size, power consumption, and the like, will lead to an increased selection of storage options.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a numeric keypad, directional buttons, pressure-sensitive software keyboard, microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device, such as an LCD or gas plasma display, is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

FIG. 2 shows several input systems for mobile telephones. Four-direction and action button 210 allows for interaction with a user interface, such as navigating between and/or executing various user interface input controls that will be described with reference to FIGS. 3A–3D. A user may enter numbers and text with keypad 220. However, as suggested above, text entry through a numeric keypad may be a cumbersome task. Audio input 230 is the mobile telephone's mouthpiece.

The present invention is described in the context of composing the reply to an electronic mail message, as illustrated in FIGS. 3A–3D. It should be noted that the present invention is not limited to any particular type of electronic message. Electronic mail is simply a familiar type of electronic message that helps to clarify the principles of the present invention. Furthermore, for electronic mail messages, the present invention may be used in composing a new message, in replying to or forwarding a received message, etc.

Figure 3A:
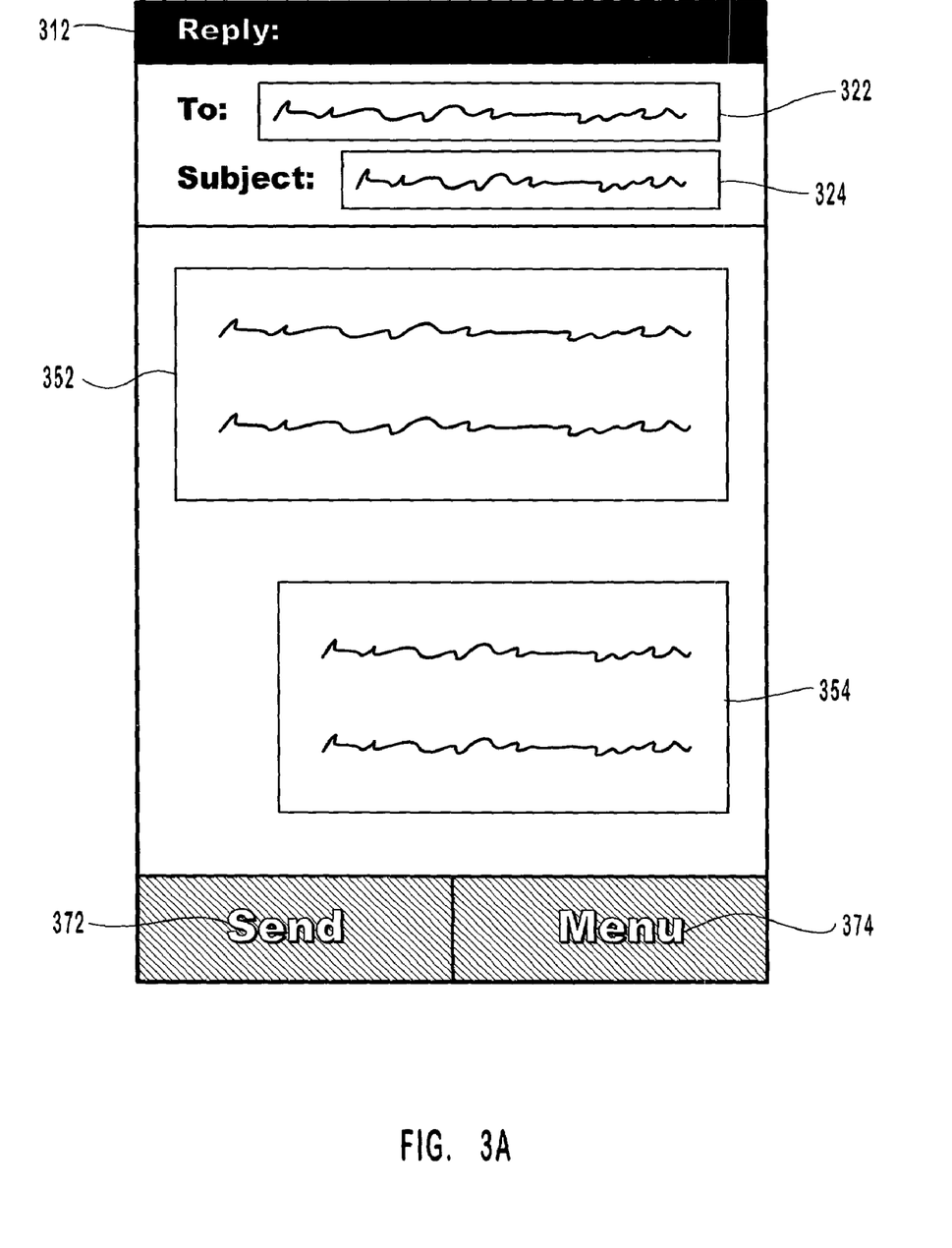
FIGS. 3A–3D illustrate a user interface that operates in accordance with the present invention.

Turning first then to FIG. 3A, title 312 indicates the user is composing a reply message. Recipients 322 identifies those who will receive the electronic message, and subject 324 briefly describes the message's topic or content. Within the body of the reply message, reply text 352 identifies text added as part of the reply and received message text 354 identifies text from the message to which the reply is directed. Message text 354 often is indented to set it off from reply text 352. Send 372 sends the reply as composed, and a user may access additional message options through menu 374. Those of skill in the art will recognize that composing a reply requires minimal if any text entry. All information, with the exception of reply text 352 may be generated from the received message. If the user adds audio data to the reply, however, reply text 352 may be completely unnecessary.

Figure 3B:
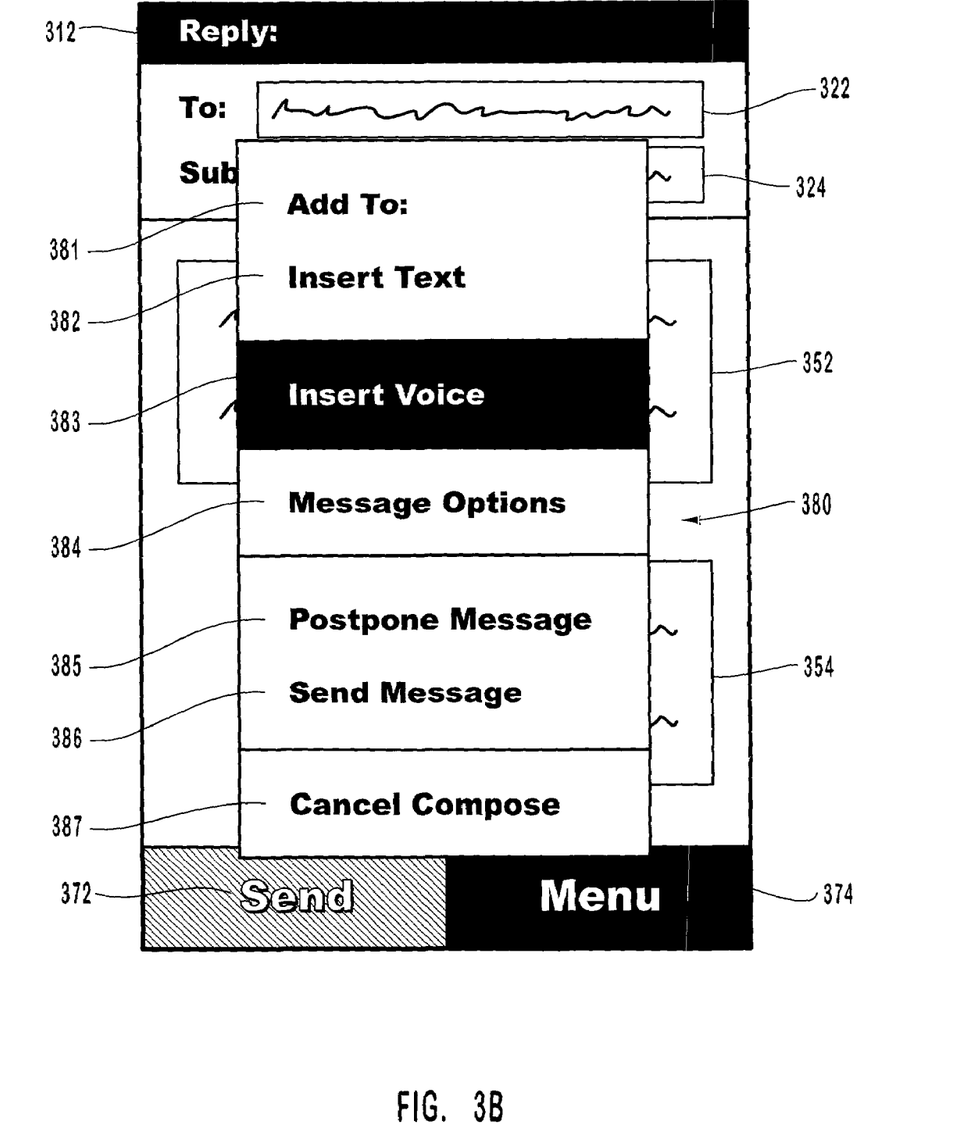

Selecting menu 374 presents the user with menu items 380, as shown in FIG. 3B. Menu 374 is highlighted upon selection to provide the user with visual feedback that menu items 380 corresponds to the activation of menu 374. Add To: 381 allows the user to identify additional recipients 322 for the reply. The user adds reply text 352 by selecting Insert Text 382. Insert Voice 383 will be described below with reference to FIG. 3C. Message Options 384 provides for message specific customizations, including message delivery options, such as message delivery and expiration times, tracking options, such a delivery and read receipts, and message settings, such as sensitivity and importance. To send the reply at a future time, the user selects Postpone Message 385. In contrast, selecting Send Message 386 sends the message immediately. The user may terminate composing the reply message by selecting Cancel Compose 387.

Figure 3C:
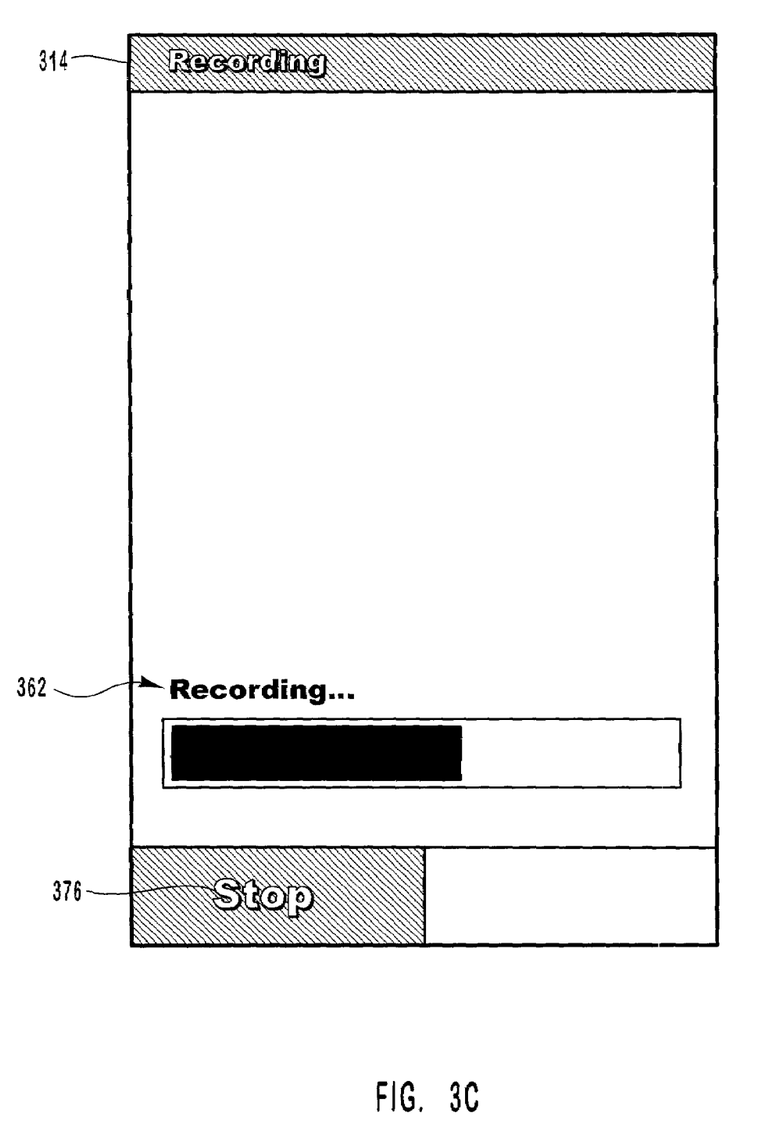

The selection of Insert Voice 383 from menu items 380 allows for the addition of audio content to the reply message, as shown in FIG. 3C. After selecting Insert Voice 383 (FIG. 3B), the audio content stream received at the mobile telephone's mouthpiece 230 (FIG. 2) is diverted to temporary storage. The temporary storage for the recording illustrated in FIG. 3C is a temporary file. "Recording" in title 314 indicates to a user that the screen is for recording audio content. A progress indicator 362 shows the amount of audio content stored in relation to a maximum amount that may be stored. The present invention does not necessarily limit the amount of audio content that may be stored and attached to an electronic message. However, mobile devices generally have some limitation on the amount of available storage and communication bandwidth. As a result, practical considerations may dictate that audio content be limited in duration. Selecting Stop 376 ends storage of the audio content stream and adds the temporary file to the reply message. As an alternative to selecting Insert Voice 383 from menu items 380 (FIG. 3B), a record button on a mobile telephone also may provide a command to add audio content to the reply message. Depending on the implementation, either releasing the record button or pressing the record button a second time has an effect similar to selecting Stop 376.

Figure 3D:
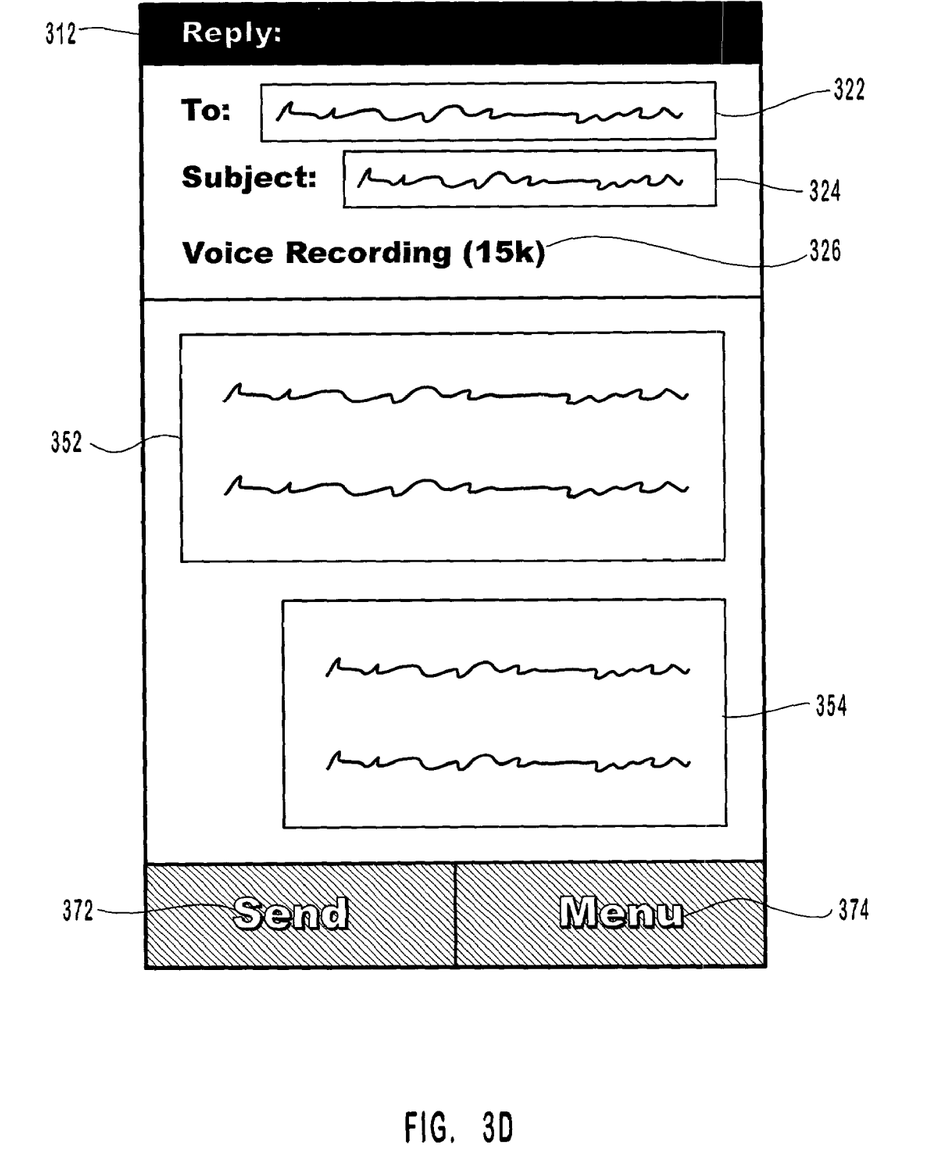

FIG. 3D depicts a reply message with attach audio content. FIG. 3D is similar to FIG. 3A, including recipients 322, subject 324, reply text 352, message text 354, Send 372 and Menu 374, with the addition of indicator 326 showing that the reply includes a voice recording of 15 kilobytes. Storage of audio content generally requires significantly more memory than the storage of text. Therefore, file formats for audio content usually implement some form of data compression to balance an appropriate level of audio quality with reasonable storage space. The WAV file format represents one implementation of this balancing. Because the WAV file format is frequently used in many computers it may be selected as a default. For electronic mail messages, the audio content may be included as a Multipurpose Internet Mail Extensions ("MIME") attachment. MIME supports a number of predefined file types and provides a standard mechanism for defining others. The present invention, however, does not necessarily require any particular file format, compression technology, or standard for adding audio content to a message.

Figure 4:
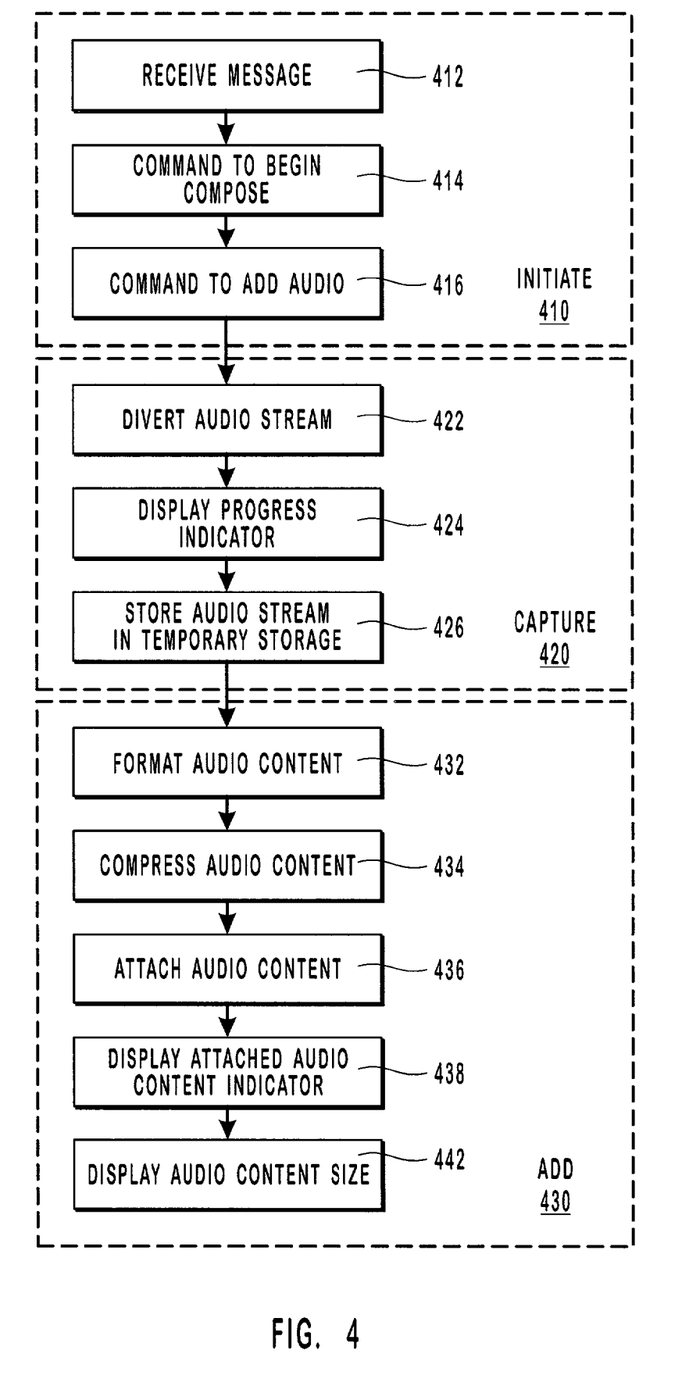
FIG. 4 shows an exemplary method for using a mobile device to compose an electronic message that includes audio content.

FIG. 4 illustrates an exemplary method for using a mobile device, such as a wireless telephone or PDA, to compose an electronic message that includes audio content. A step for initiating (410) the creation of an electronic message may include an act of receiving (412) a specific electronic message. For example, the electronic message being created may be a reply to an electronic message received earlier. The act of receiving a command to begin composing (414) the electronic message and the act of receiving a command to add audio content (416) to an electronic message may also be included within the step for initiating (410) creation of the electronic message. Commands may be received from selection of a user interface menu item as illustrated in FIGS. 3B and 3C, from a record button, etc.

A step for capturing (420) audio content from an audio content stream may begin with the act of diverting (422) the audio content stream being received at an audio input, such as wireless telephone mouthpiece 230 (FIG. 2), to a temporary storage. The temporary storage may include a temporary file stored in volatile memory, such as RAM, or stored in non-volatile memory, such as optical and/or magnetic media. An act of displaying (424) a progress indicator may accompany the act of storing (426) the audio content stream in temporary storage. The progress indicator shows the current amount of storage used in storing the audio content stream compared to a predetermined maximum amount of storage that may be added to a single message, although other types of progress indicators are not excluded by the present invention. The acts of displaying (424) a progress indicator and storing (426) the audio content stream may be included in the step for capturing (420) audio content.

The step for adding (430) audio content to an electronic message may include the following acts. An act of formatting (432) the audio content is based how the audio content will be added to the electronic message. For example, audio content added as an attachment to an electronic mail message is formatted according to the file type of the attachment. In many circumstances, a WAV file format may be selected because it is a format recognize by many computing systems. An act of compressing (434) the audio content may accompany the act of formatting (432), consistent with a particular file format, or may represent an entirely distinct operation. An act of attaching (436) the audio content to the electronic message is based on the facilities allowed by a particular electronic message. For electronic email messages, the audio content may be included as a MIME attachment. The acts of displaying an attached audio content indicator (438) and displaying audio content size (442) provide the user some feedback that audio content has been added to the electronic message as desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computerized system that includes one or more mobile devices and an electronic message server supporting wireless communication, wherein at least some of the mobile devices have an input system that is optimized for numeric input rather than text input, and wherein at least some of the mobile devices are capable of sending and receiving electronic messages, a method of composing an electronic message using a mobile device, the method comprising acts of:

receiving a command to begin composing an electronic message at a mobile device;

receiving a command to add audio content to the electronic message at the mobile device, wherein a total amount of audio content added is limited to a predetermined maximum set for a single electronic message, wherein the limitation of the predetermined maximum set is dictated by an available storage and a communication bandwidth of said device;

diverting to a temporary storage within the mobile device, an audio content stream received at an audio input wherein the total amount of audio content diverted to the temporary storage is limited to the predetermined maximum;

displaying a progress indicator to show a current amount of temporary storage used in storing the data audio content stream compared to the predetermined maximum;

storing the audio content stream within the mobile device in a format that is compatible with adding audio content to the electronic message; and attaching the formatted audio content to the electronic message at the mobile device.

2. A method as recited in claim 1, wherein the mobile device comprises a phone and the temporary storage comprises a temporary data file, and wherein the audio content stream received at the audio input is generated by a user speaking into the phone's mouthpiece.

3. A method as recited in claim 1, wherein the electronic message comprises an electronic mail message, and wherein the formatted audio content is attached as an electronic mail attachment.

4. A method as recited in claim 3, wherein the electronic mail message is composed in either replying to or forwarding a specific electronic mail message, the method further comprising an act of receiving the specific electronic mail message.

5. A method as recited in claim 1, wherein the format used to store the audio content stream allows for data compression, the method further comprising an act of compressing the audio content stream in accordance with the storage format.

6. A method as recited in claim 5, wherein the storage format is a WAV file format.

7. A method as recited in claim 1, wherein receiving the command to add audio content to the electronic message is based on either selection of a user interface menu item to add audio content to the electronic message or a press of a record button.

8. A method as recited in claim 1, further comprising acts of:

displaying an indicator that audio content has been attached to the electronic message; and displaying a size of the attached audio content.

9. In a computerized system that includes one or more mobile devices and an electronic message server supporting wireless communication, wherein at least some of the mobile devices have an input system that is optimized for numeric input rather than text input, and wherein at least some of the mobile devices are capable of sending and receiving electronic messages, a method of composing an electronic mail message using a wireless telephone, the method comprising acts of:

receiving a command to begin composing an electronic mail message at a wireless telephone;

receiving a command to add audio content to the electronic mail message at the wireless telephone, wherein a total amount of audio content added is limited to a predetermined maximum set for a single electronic mail message, wherein the limitation of the predetermined maximum set is dictated by an available storage and a communication bandwidth of said device;

diverting to a temporary storage within the wireless telephone, an audio content stream received at a wireless telephone voice input wherein the total amount of audio content diverted to temporary storage is limited to the predetermined maximum;

displaying a progress indicator to show a current amount of temporary storage used in storing the audio content stream compared to the predetermined maximum;

storing the audio content stream within the wireless telephone in a format that is compatible with adding audio content to the electronic mail message; and attaching the formatted audio content to the electronic mail message at the wireless telephone.

10. A method as recited in claim 9, wherein the electronic mail message is composed in either replying to or forwarding a specific electronic mail message, the method further comprising an act of receiving the specific electronic mail message.

11. A method as recited in claim 9, wherein attaching the formatted audio content to the electronic mail message complies with a Multipurpose Internet Mail Extensions specification.

12. A method as recited in claim 9, wherein the format used to store the audio content stream allows for data compression, the method further comprising an act of compressing the audio content stream in accordance with the storage format.

13. A method as recited in claim 9, wherein receiving the command to add audio content to the electronic mail message is based on either selection of a user interface menu item to add audio content to the electronic mail message or a press of a record button, the method further comprising acts of:

displaying an indicator that audio content has been attached to the electronic mail message; and displaying a size of the attached audio content.

14. In a computerized system that includes one or more mobile devices and an electronic message server supporting wireless communication, wherein at least some of the mobile devices have an input system that is optimized for numeric input rather than text input, and wherein at least some of the mobile devices are capable of sending and receiving electronic messages, a method of composing an electronic message using a mobile device, the method comprising steps for:

initiating the creation of an electronic message at a mobile device, the electronic message to include audio content that is limited to a predetermined maximum set for a single electronic message, wherein the limitation of the predetermined maximum set is dictated by an available storage and a communication bandwidth of said device;

capturing audio content at the mobile device from an audio content stream being received at an audio input, wherein the audio content stream is generated by a user speaking into the audio input wherein the step for capturing audio content from the audio content stream comprises acts of:

diverting the audio content stream to a temporary storage wherein the temporary storage comprises a temporary data file that is limited to the predetermined maximum, displaying a progress indicator to show a current amount of temporary storage used in storing the audio content stream compared to the predetermined maximum, and storing the audio content stream in the temporary storage; and adding the audio content to the electronic message at the mobile device in a format that is compatible with the electronic message.

15. A method as recited in claim 14, wherein the mobile device comprises a telephone, and wherein the audio stream is generated by a user speaking into the telephone's mouthpiece.

16. A method as recited in claim 14, wherein the electronic message comprises an electronic mail message, and wherein the step for adding the audio content to the electronic message comprises acts of:

formatting the captured audio content stream to be compatible with the electronic mail message; and attaching the formatted audio content to the electronic mail message.

17. A method as recited in claim 16, wherein the electronic mail message is composed in either replying to or forwarding a specific electronic mail message, and wherein the step for initiating the creation of the electronic mail message includes an act of receiving the specific electronic mail message.

18. A method as recited in claim 14, wherein a format used to store the audio content stream allows for data compression, and wherein the step for adding the audio content to the electronic message comprises an act of compressing the audio content stream in accordance with the format used to store the audio content.

19. A method as recited in claim 14, wherein the step for initiating the creation of an electronic message comprises acts of:

receiving a command to begin composing an electronic message; and receiving a command to add audio content to the electronic message, wherein the act of receiving the command to add audio content to the electronic message is based on either selection of a user interface menu item to add audio content to the electronic message or a press of a record button.

20. A method as recited in claim 14, wherein the step for adding the audio content to the electronic message comprises acts of:

displaying an indicator that audio content has been added to the electronic message; and displaying a size of the added audio content.

21. In a computerized system that includes one or more mobile devices and an electronic message server supporting wireless communication, wherein at least some of the mobile devices have an input system that is optimized for numeric input rather than text input, and wherein at least some of the mobile devices are capable of sending and receiving electronic messages, a computer program product for implementing a method of composing an electronic message using a mobile device, comprising:

a computer readable medium for carrying machine-executable instructions for implementing the method; and wherein said method is comprised of machine-executable instructions for a mobile device performing acts of:

receiving a command to begin composing an electronic message at a mobile device;

receiving a command to add audio content to the electronic message at the mobile device, wherein a total amount of audio content added is limited to a predetermined maximum set for a single electronic message, wherein the limitation of the predetermined maximum set is dictated by an available storage and a communication bandwidth of said device;

diverting to a temporary storage within the mobile device, an audio content stream received at an audio input wherein the total amount of audio content diverted to temporary storage is limited to the predetermined maximum;

displaying a progress indicator to show a current amount of temporary storage used in storing the audio stream compared to the predetermined maximum;

storing the audio content stream within the mobile device in a format that is compatible with adding audio content to the electronic message; and attaching the formatted audio content to the electronic message at the mobile device.

22. A computer program product as recited in claim 21, wherein the mobile device comprises a phone and the temporary storage comprises a temporary data file, and wherein the audio content stream received at the audio input is generated by a user speaking into the phone's mouthpiece.

23. A computer program product as recited in claim 21, wherein the electronic message comprises an electronic mail message, and wherein the formatted audio content is attached as an electronic mail attachment.

24. A computer program product as recited in claim 23, wherein the electronic mail message is composed in either replying to or forwarding a specific electronic mail message, the method further comprising an act of receiving the specific electronic mail message.

25. A computer program product as recited in claim 21, wherein the format used to store the audio content stream allows for data compression, the method further comprising an act of compressing the audio content stream in accordance with the storage format.

26. A computer program product as recited in claim 25, wherein the storage format is a WAV file format.

27. A computer program product as recited in claim 25, wherein receiving the command to add audio content to the electronic message is based on either selection of a user interface menu item to add audio content to the electronic message or a press of a record button.

28. A computer program product as recited in claim 21, the method further comprising acts of:

displaying an indicator that audio content has been attached to the electronic message; and displaying a size of the attached audio content.

29. The method as recited in claim 1, wherein the predetermined maximum is based on available communication bandwidth.

30. The method as recited in claim 1, wherein the predetermined maximum is based on an amount of available storage.

31. The method as recited in claim 1, wherein the progress indicator is a graphical sliding bar.

32. The method as recited in claim 9, wherein the predetermined maximum is based on available communication bandwidth.

33. The method as recited in claim 9, wherein the predetermined maximum is based on an amount of available storage.

34. The method as recited in claim 9, wherein the progress indicator is a graphical sliding bar.

35. The method as recited in claim 14, wherein the predetermined maximum is based on available communication bandwidth.

36. The method as recited in claim 14, wherein the predetermined maximum is based on an amount of available storage.

37. The method as recited in claim 14, wherein the progress indicator is a graphical sliding bar.

38. The computer program product as recited in claim 21, wherein the predetermined maximum is based on available communication bandwidth.

39. The computer program product as recited in claim 21, wherein the predetermined maximum is based on an amount of available storage.

40. The computer program product as recited in claim 21, wherein the progress indicator is a graphical sliding bar.

* * * * *

UNITED STATES PATENT AND TRADEMARK OFFICE
CERTIFICATE OF CORRECTION

| | | |
|---|---|---|
| PATENT NO. | : 7,082,298 B2 | Page 1 of 1 |
| APPLICATION NO. | : 09/773353 | |
| DATED | : July 25, 2006 | |
| INVENTOR(S) | : Enns et al. | |

It is certified that error appears in the above-identified patent and that said Letters Patent is hereby corrected as shown below:

In column 2, line 64, delete "a," and insert -- a --, therefor.

In column 11, line 41, in Claim 27, delete "claim 25," and insert -- claim 21, --, therefor.

Signed and Sealed this

Twentieth Day of April, 2010

David J. Kappos
*Director of the United States Patent and Trademark Office*